Patented Feb. 2, 1943

2,309,982

UNITED STATES PATENT OFFICE 2,309,982

TEXTILE PRINTING WITH EMULSION CONTAINING DYESTUFF REACTANT

William B. Reynolds, Elmhurst, Long Island, and Sylvester A. Scully, Yonkers, N. Y., assignors to Interchemical Corporation, New York, N. Y., a corporation of Ohio No Drawing. Application May 27, 1940, Serial No. 337,488

6 Claims. (Cl. 8—71)

This invention relates to textile printing compositions, and relates to textile printing compositions characterized by their unusually low cost and excellent printing properties. Specifically, this application relates to a type of printing paste comprising an emulsion of water in a hydrophobe organic liquid, the emulsion containing an azotizable amine, a chemical capable of producing nitrous acid in the presence of acid, and an azo coupling component.

It has been proposed heretofore to print on fabrics with aqueous systems including an azotizable amine, a chemical capable of producing nitrous acid in the presence of acid, and an azo coupling component, producing the azo compound and causing coupling by exposing the print to wet acid fumes after printing. This method has never been satisfactory, because of the fact that yields are extremely poor due to improper conditions of diazotization, the results lack uniformity even at low yields, and the prints are considerably blurred, due to the migration of the dyestuff components in the acid ager.

We have discovered that sharp uniform prints can be obtained with high color yields, by using a printing paste comprising an emulsion of water in a hydrophobe organic liquid comprising a solution in a volatile water-immiscible organic solvent of a substance sufficiently film-forming to form stable water-in-organic liquid emulsions, the emulsion containing a microscopically dispersed azotizable amine, a chemical capable of producing nitrous acid in the presence of acid, and an azo coupling component, causing diazotization and coupling to take place in the acid ager.

In order to insure sharpness of print, it is essential that either the amine or the coupling component be substantive for the fiber, or that either the amine or the coupling component be distributed in the aqueous inner phase of the emulsion, either as a solution or as microscopic dispersion. In either case, one of the components is affixed to the fabric in sharp lines, and on acid ageing, the color-forming reactions are restricted to those lines, and do not cause migration over the fabric.

In order to develop color strength, all the materials must be at least microscopically dispersed—i. e., the particle size of the chemicals should be so small that they are not individually visible to the naked eye; and best results are obtained when the reactants are in solution. In the preferred form of our invention, we use an emulsion comprising an aqueous solution of the azo coupling component, and an organic phase solution of the azotizable amine; the nitrite may be in solution in the aqueous phase as sodium nitrite, or in the organic phase as an alkyl nitrite. With this proper distribution of the reacting components, the azotization of the amine proceeds smoothly in the acid ager without any great loss of color, in spite of the relatively high temperatures. This appears to be due to the fact that the reactants are in such close contact that the insoluble dye is formed from the azo compound, and affixed to the fibers, so rapidly that no great decomposition occurs, whereas with improper distribution, considerable decomposition occurs during migration of the diazo component toward the coupling component.

Typical examples of our invention are the following:

Example 1

1.8 parts by weight 4-chloro-2-amino anisole dissolved in—
220.0 parts by weight Solvesso #2 (hydrogenated petroleum naphtha—boiling range 135–180° C.)

are mixed with a water-in-oil emulsion consisting of—

0.4 part by weight ethyl cellulose (47% ethoxy 500 centipose viscosity)
5.2 parts by weight xylene
0.9 parts by weight butanol
3.5 parts by weight water There is then stirred into the emulsion, in order 3.0 parts by weight ortho anisidide of beta hydroxy naphthoic acid
1.0 parts by weight 37% formaldehyde
64.0 parts by weight water, containing 2 parts by weight NaOH and 2 parts by weight sodium nitrite The paste is now ready to print; on cotton or rayon it produces a sharp print, bright red in color after development in a standard acid ager with, for example, acetic acid.

Example 2

Same as Example 1, except that 1.45 parts of 4-chloro-2-amino toluene are substituted for the 4-chloro-2-amino anisole and 2.8 parts of the ortho toluidide of beta hydroxy naphthoic acid are substituted for the o-anisidide of beta hydroxy naphthoic acid. A bright, yellow-shade red is obtained.

Other combinations which have been used with success in the formulation are:

| Base | Coupling component | Shade |
|---|---|---|
| 4-chloro-2-amino toluene | Di-aceto acetyl-o-tolidine | Yellow. |
| 4-chloro-2-amino toluene | o-Phenetidide of beta hydroxy naphthoic acid. | Bright scarlet. |
| 3,3′ dichlor benzidine | Aceto acet-o-toluidide | Yellow. |
| 3,3′ dichlor benzidine | Phenyl methyl pyrazolane | Orange. |
| 4-benzoyl amino-2,5 di-ethoxy aniline. | Anilide of beta hydroxy naphthoic acid. | Blue. |

*Example 3*

1.22 parts of dianisidine are dissolved in 18.4 parts of white pine oil. To this are added 20 parts of a 5% solution of ethyl cellulose in a 2 to 1 mixture of Solvesso #2 and toluene. 2.6 parts of the anilide of beta hydroxy naphthoic acid are dissolved in 56 parts of water, 2 parts of sodium hydroxide and 2 parts of sodium nitrite. This solution is slowly run with rapid agitation into the organic phase prepared above. A smooth water-in-oil emulsion results. When printed and acid-aged a sharp, blue print results. In place of the pine oil cyclohexanone, tetra chloro ethane or other dianisidine solvents can be used.

While we have shown only a few examples of our invention, it is obvious that examples may be multiplied indefinitely without departing from the scope thereof, which is defined in the claims.

It is obvious that any azotizable amines and any coupling components may be used, provided they are distributed colloidally or dissolved in the two phases.

The continuous outer phase may utilize any water-immiscible solvent or mixture of solvents, even though a minor portion of the solvent mixture be water-miscible in itself. The use of large percentages of water-miscible solvents should be avoided, however, since emulsion stability may be impaired. The substance dissolved in the solvent should be sufficiently film-forming to be capable of forming a continuous phase about the water; practically all water-insoluble film-forming agents may be used, although care should be taken that the substance chosen is not attacked by the chemicals in the water phase. Satisfactory materials include bodied oils, natural resins, such as damar, East India, rosin, its glycerol ester gum, etc., synthetic resins such as alkyd, hydrophobe urea-formaldehyde, cumarone, etc., cellulose esters such as cellulose nitrate, cellulose acetate, and the mixed organic esters, cellulose ethers such as benzyl and ethyl cellulose, natural and synthetic rubbers, and heavy metal soaps.

As can be seen from the examples, the film-forming substance should be kept at a minimum consonant with emulsion stability, amounts of film-forming substance of the order of 2% or less are preferred, while amounts above about 5% reduce the color yield.

We claim:

1. A textile printing composition comprising an emulsion the outer phase of which comprises a water-immiscible solution of a film-forming substance in a volatile water-immiscible organic solvent, and the inner phase of which comprises an aqueous fluid, the emulsion containing an azotizable amine, a nitrite, and a compound capable of coupling with the azotized amine, the amine, nitrite and coupling compound being at least colloidally distributed through the emulsion, the amine and coupling compound being in separate phases of the emulsion.

2. The composition of claim 1, in which the nitrite and coupling component are distributed in the inner aqueous phase, and the amine in the outer organic phase.

3. The composition of claim 1, in which the nitrite and coupling component are dissolved in the inner aqueous phase, and the amine in the outer organic phase.

4. The method which comprises printing on cloth with an azotizable amine, a nitrite, and a compound capable of coupling with the azotized amine, colloidally dispersed in an emulsion the outer phase of which comprises a water-immiscible solution of a film-forming substance in a volatile water-immiscible organic solvent, and the inner phase of which comprises an aqueous fluid with the amine and the coupling compound in separate phases of the emulsion, and passing the cloth through an acid ager whereby the amine is azotized and couples to form an ingrain print.

5. The method of claim 4, in which the nitrite and coupling component are distributed in the inner aqueous phase, and the amine in the outer organic phase.

6. The method of claim 4, in which the nitrite and coupling component are dissolved in the inner aqueous phase, and the amine in the outer organic phase.

WILLIAM B. REYNOLDS.
SYLVESTER A. SCULLY.